Patented Apr. 17, 1923

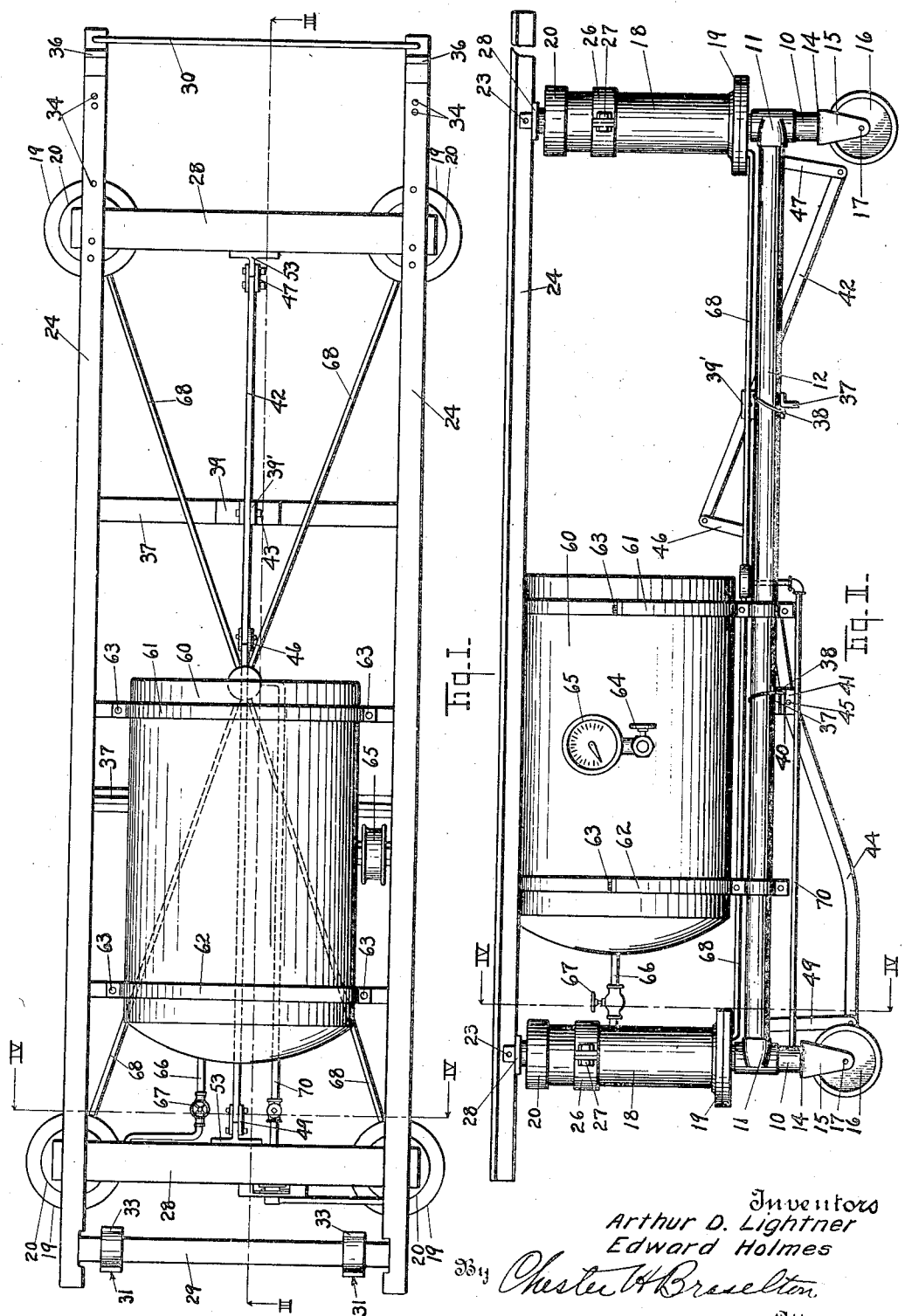

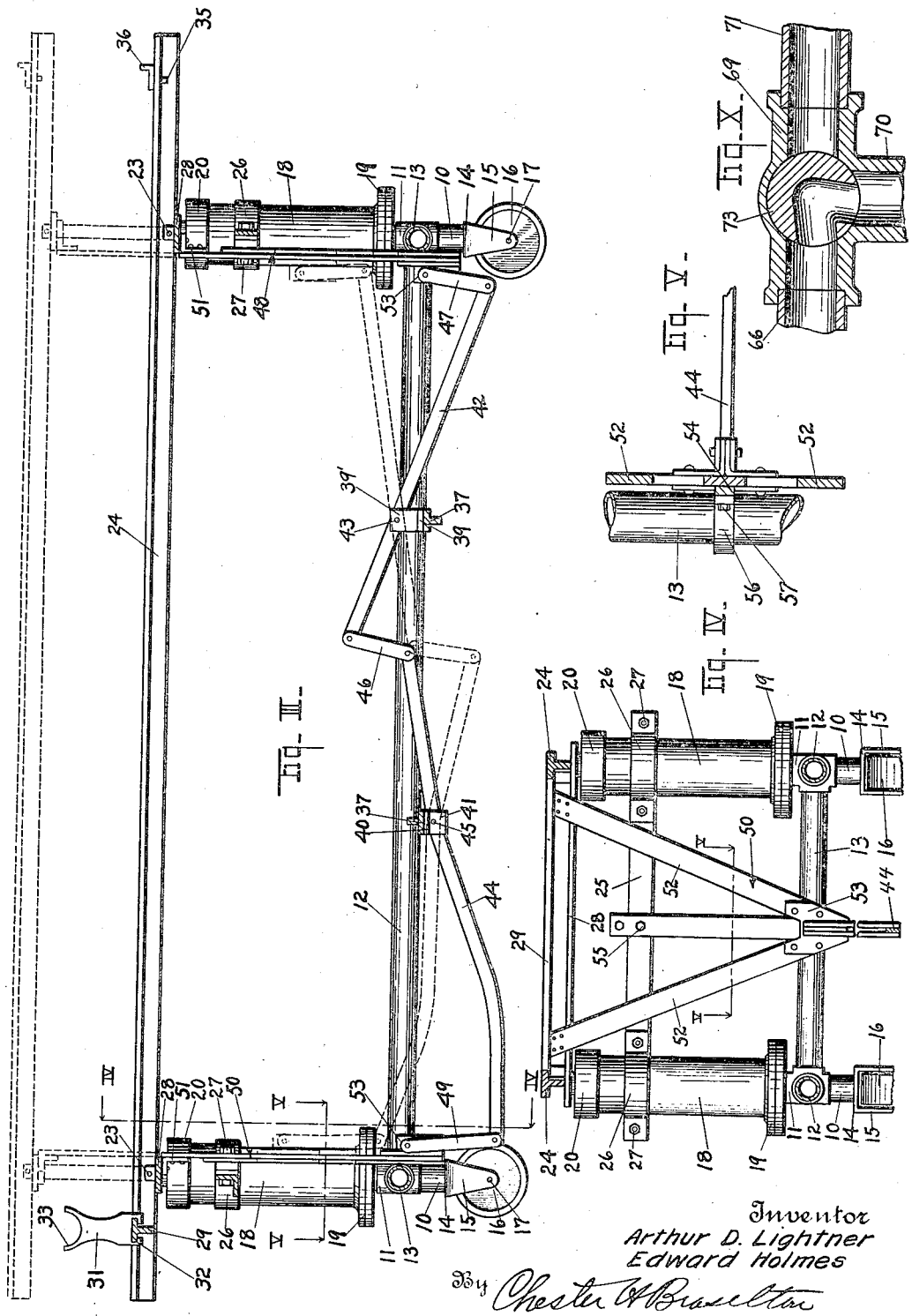

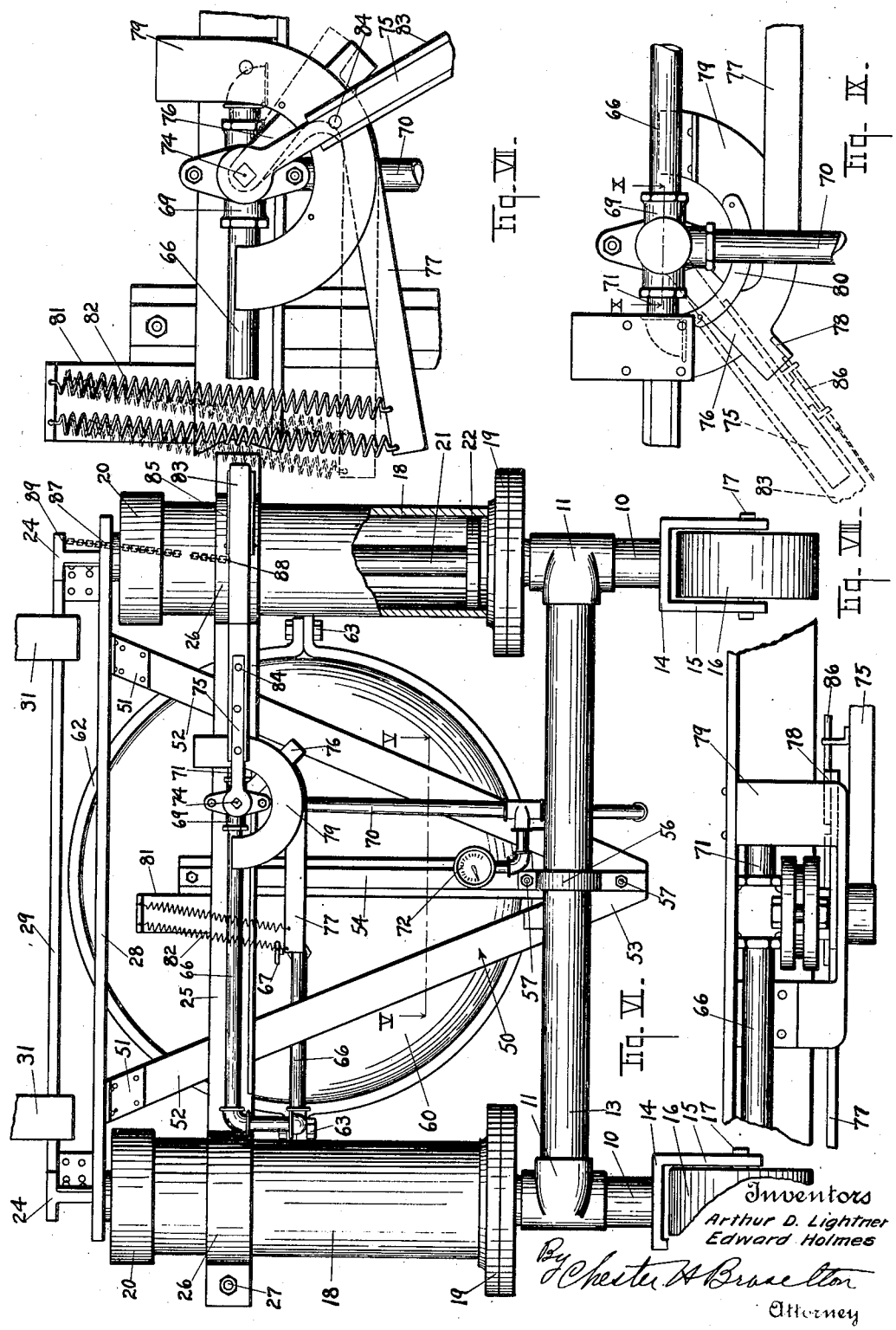

UNITED STATES PATENT OFFICE.

ARTHUR D. LIGHTNER AND EDWARD HOLMES, OF TOLEDO, OHIO, ASSIGNORS TO THE WILLYS-OVERLAND COMPANY, OF TOLEDO, OHIO, A CORPORATION OF OHIO.

ELEVATING TRUCK.

Application filed January 18, 1919. Serial No. 271,834.

*To all whom it may concern:*

Be it known that we, ARTHUR D. LIGHTNER and EDWARD HOLMES, citizens of the United States, residing at Toledo, county of Lucas, and State of Ohio, have invented certain new and useful Improvements in Elevating Trucks, of which we declare the following to be a full, clear, and exact description.

This invention relates to elevating trucks, and more particularly to trucks of this character which are designed for use in connection with a dock hoist for receiving automobiles from the dock hoist and conveying them to a freight car in which they are to be loaded and secured in place by a system of blocking and supports commonly known as "double-decking". Although the device is particularly adapted for use in connection with automobiles, yet it is to be understood that it may be used for any other purpose for which it may be found to be adapted.

One object of the invention is to provide a simple and economical form of equalizing means for controlling the movable frame portion of the truck, and maintaining the same substantially horizontal.

A further object of this invention is to provide, in a truck of the character described having a movable frame, means for automatically limiting the upward movement of the frame and for maintaining the same at a pre-determined height.

A further object of this invention is to provide a fluid operated elevating truck, wherein the fluid pressure may be controlled by the movable frame.

A further object of the invention is to provide a fluid operated elevating truck provided with means for releasing the fluid pressure upon the elevating mechanism when the same is to be lowered.

A further object of this invention is to provide an improved truck of the character described. which is of simple construction and efficient in operation under different conditions of use.

Further objects of this invention relate to economies of manufacture and details of construction, as will hereinafter appear from the detailed description to follow.

We accomplish the objects of our invention in one instance by the devices and means described in the following specification, but it is evident that the same may be varied widely without departing from the scope of the invention, as pointed out in the appended claims.

A structure constituting one embodiment of our invention, which may be the preferred, is illustrated in the accompanying drawings, forming a part hereof, in which:

Figure I is a top plan view of the improved elevating truck.

Figure II is a side elevation of the truck, showing the position of the operating parts when the movable frame is lowered.

Figure III is a side elevation of the truck with the compressed air tank removed to better show the location of the operating mechanism, and indicating by the dotted lines the position of the equalizing elements when the truck is in raised position.

Figure IV is a vertical sectional view of the elevating truck, taken along the line IV—IV of Figures I and III, showing the movable frame in its lowered position.

Figure V is a detailed, sectional view taken on the line V—V of Figures IV—VI.

Figure VI is a view in end elevation, showing the mechanism for controlling the fluid pressure supply and having one cylinder broken away to show the position of the piston head therein.

Figure VII is an enlarged detail view of the mechanism for controlling the supply of fluid pressure to the cylinders Figure VIII is a top plan view of the mechanism shown in Figure VII.

Figure IX is an enlarged detail view of the mechanism shown in Figure VII, taken from the opposite side thereof.

Figure X is a vertical sectional view taken along the line X—X of Figure IX.

In the drawing, similar reference characters refer to corresponding parts throughout the several views, and the sectional views are taken looking in the direction of the small arrows at the end of the section lines.

In the loading of automobiles for shipment, it is customary to employ a hoist located beneath the floor of a dock, and provided with rails which, in the lowered position of the hoist, are substantially level with the floor of the dock. An automobile which is to be shipped is run upon the hoist and raised to a point where a truck may be placed thereunder to receive the automobile and convey it to a freight car.

In loading the automobiles into freight cars for shipment it is customary to employ a method of loading which is commonly known as "double-decking". In employing this method of loading, a series of automobiles is raised into the upper part of the car and secured therein by a suitable system of blocking, whereupon a second series of automobiles is placed in the car beneath the first series, and secured to the floor of the car in any suitable manner.

The improved form of elevating truck described herein is found to be particularly well adapted for use in connection with the above described method of loading automobiles in freight cars.

Referring to the drawing, the main frame portion of the truck comprises a plurality of vertical standards 10, each of which is provided with a coupling member 11 having a means for connecting each standard to one end of one of the longitudinally extending frame members 12, and one end of one of the transverse frame members 13. Revolvably mounted upon the lower end of each of the upright standards 10 is a bracket 14 provided with forked arms 15 between which is rotatably mounted a wheel 16 upon a pin 17 connecting the arms. Thus there is formed a rigid rectangular frame wherein the longitudinal members 12 and the transverse members 13 are firmly secured to the upright members at each corner of the frame in such a manner as to form a rigid supporting structure. The brackets above described, which are adapted to be rotatably mounted in the lower ends of the upright standards, may be provided with any of the usual forms of anti-friction devices so as to enable them to rotate freely within the standards.

Mounted upon the upper end of each standard 10 is a pressure cylinder 18 provided with a base portion 19 for attachment to the upper end of the standard, and having an upper cylinder head 20 provided with an opening therein for the reception of a piston rod 21 carrying a piston head 22 fitting closely within the interior of the cylinder. The upper ends of the two piston rods upon each side of the machine are pivotally connected at 23 to one of the longitudinally extending members 24 of a movable frame. A pair of transverse frame members 25 connects the front and rear cylinders at the ends of the truck, each of the frame members being provided at each end with split bearings 26 which encircle the cylinders and are held in position thereon by bolts 27. It will be seen that a cylinder is located at each of the corners of the truck, where it is firmly secured in place by attachment to the upper end of each of the upright standards, the two cylinders at each end of the truck being firmly secured together by the upper transverse members 25, and each of the several pistons carried by the cylinders being secured to the movable frame in such a manner that the frame is raised and lowered as the pistons are given vertical movement within the cylinders.

Transversely extending plates 28 connect the opposite longitudinal members 24 of the movable frame, being secured to said longitudinal members near the points of connection of the several pistons thereto. A transverse member 29 connects the two longitudinal frame members 24 near their rear ends, being rigidly secured to the two frame members 24 in any suitable manner. The front ends of the frame members 24 are secured together by a transverse rod 30. A rigid movable frame is thus provided comprising the two longitudinal frame members 24 and the transverse members 28, 29 and 30, which is secured to the upper ends of the piston rods at points near its corners in such a manner as to be readily raised and lowered upon simultaneous movement of the piston rods. The transverse member 29 is preferably T-shape in cross section and is provided with a pair of upright brackets 31 which rest upon the upper surface of the transverse member 29, and are provided with downwardly extending inturned lips 32 in such a manner that the brackets may be readily adjusted longitudinally of the member 29 without being easily detached therefrom. Each of the upstanding brackets 31 is provided with a pair of forked arms 33 at its upper end to provide a bearing adapted to receive the axle of an automobile. Each of the longitudinally extending members 24 has a plurality of openings 34 formed in its upper surface near the front end thereof for the reception of a pin 35 extending from the lower face of a stop 36. The stops 36 may be of any desired shape and are preferably of sufficient height to receive and support the front axle of an automobile, which may have been previously elevated by a dock hoist. By means of the openings 34 formed in the ends of the longitudinal members 24 and the pins 35 the stops 36 may be adjusted longitudinally of the members 24 in such a manner as to accommodate the stops 36 for the reception of different types of automobiles. The upright brackets 31, which are adapted to support the rear axle of an automobile, may be adjusted longitudinally of the frame member 29 in such a manner as to accommodate the different forms of rear axles, and hold the automobile properly upon the movable frame. When an automobile is to be carried upon the movable frame, the brackets 31 are properly adjusted for receiving the rear axle, and the stops 36 are then secured in the proper openings so as to bear against the under surface of the front axle of the automobile, whereupon the dock hoist may be lowered and the automobile placed upon the movable frame. A pair of transverse frame members 37 are secured at their ends to each of the opposite longitudinally extending frame members 12 by any suitable means such as U-bolts 38. The transverse members 37 are preferably attached to each longitudinal frame member 12 at points substantially equally distant from the centers of the said longitudinal members, which results in spacing the members 37 substantially equal distances from the transverse members 13. A bracket 39 provided with upwardly extending arms 39' is mounted upon the forward transverse member 37 at a point substantially midway between the longitudinal side members 12, and a similar bracket 40 provided with downturned arms 41 is mounted upon the lower face of the rear transverse members 37 in a similar manner. A lever arm 42 is pivoted to the upwardly extending arms 39' of the brackets 39 at 43 and, in a similar manner, a corresponding lever arm 44 is pivoted at 45 to the downwardly extending arms of the bracket 40. The inner ends of the lever arms 42 and 44 are connected by a link 46 pivotally attached to each arm. The outer end of the lever arm 42 is pivotally connected to a link 47 which is in turn pivotally connected to a vertical frame 48, the particular construction of which will be described hereinafter. In a similar manner the outer end of the lever arm 44 is pivotally connected to a vertical frame 50 through a link 49. The vertical frames 48 and 50 are similar in all respects, and a detailed description of one of these frames follows. A pair of angular brackets 51 are secured to each of the transverse members 28 and serve to connect each of the transverse members 28 to a pair of downwardly extending converging members 52 so arranged that the lower ends of said downwardly extending members are in proximity to each other, and are connected together by a bracket member 53. The link 47 is pivotally connected to the bracket 53 of the vertical frame 48, while in a similar manner the link 49 is pivotally connected to the corresponding bracket of the vertical frame 50. A vertical frame member 54 is mounted or otherwise firmly secured to the inner face of each of the transverse members 25 as at 55, at its upper end, and is secured to the inner face of the corresponding transverse member 13 by a clamp 56 and bolts 57. The vertically positioned frame members 54 connect the transverse frame members 25 and 13 at each end of the truck, and the vertical members 54 slidably engage portions of the outer faces of the frames 48 and 50, and serve as bearings therefor during the vertical movement of the frames 48 and 50. It will be seen that the frames 48 and 50 are firmly secured to and form a part of the movable frame portion of the truck. The purpose of the mechanism just described is to provide an equalizing means for the movable frame during its vertical movement.

From the above description it will be evident that the lever arms 42 and 44 are pivotally mounted upon portions of the main frame in such a manner that those portions of the two lever arms which extend inwardly from their pivotal points are of substantially equal length, and the two outer portions of said lever arms which extend outwardly from their points of pivotal connection with the main frame are also of substantially equal length. The links 47 and 49 being also of equal length, it results that any vertical movement of one end of the movable frame will necessarily result in an equal movement of the other end of the movable frame in the same direction. When force is exerted upon the piston rods to raise the movable frame, the front and rear portions thereof will thus be compelled to move in unison and the frame will, therefore, be held substantially horizontal during its upward movement. In raising automobiles or other structures upon devices of this character, it is frequently impractical to so position the automobile or other material to be raised in such a manner as to effect a perfect balance between the front and rear portions of the movable frame, and when such conditions arise there is a tendency for that part of the frame carrying the lesser weight to be raised faster than the other, which results in an unequal raising of the weight and may cause a jamming of the pistons. One of the results attained by this provision of the lever arms and co-operating parts is to overcome such difficulties and cause the movable frame to be raised in such a manner that it will at all times lie in a plane substantially parallel with a given plane, or in the structure shown herewith, in a plane substantially parallel with the horizontal. If it is desired to position the movable frame in such a manner that it will normally lie at an angle to the horizontal, such an adaptation of the device shown herewith can be accomplished by making the necessary changes in the length of the connecting links so that one end of the frame will constantly move slightly in advance of the other. However, in the form shown herewith, and for the purpose of which it is intended to be used, the lever arms are pivoted in such a manner and the links are formed of suitable length to maintain the movable frame substantially horizontal at all times, while it is being raised and lowered.

Any suitable motive force may be employed for raising and lowering the movable frame, but a fluid pressure means such as compressed air is preferably employed, as shown in the accompanying drawing. 60 is a compressed air tank supported in position by a plurality of bands 61 and 62 which preferably surround the tank and are secured together by suitable means such as bolts 63. The supporting bands may be attached to the longitudinal side members of the frame 12 in any suitable manner for supporting the tank in proper position. The tank is provided with an inlet valve 64 through which compressed air may be admitted to the tank until a sufficient pressure is attained therein, as indicated upon pressure gauge 65. The tank is provided with an outlet pipe 66 having a valve 67, the said outlet pipe 66 communicating through a connecting pipe 70 with a plurality of branch pipes 68, each of which is connected with the lower end of one of the cylinders 18, as shown in Figure II, in such a manner that fluid pressure may be admitted into the cylinders beneath the piston heads 22. The outlet pipe 66 is connected by a T-joint 69 with the connecting pipe 70 communicating with the various branches 68, and an open-ended pipe 71. A pressure gauge 72 is located within the branch 70 which communicates with the various branches 68 for the purpose of indicating the pressure within the cylinders at any given time. A three-way valve 73 is mounted within the T-joint 69, the said valve being provided with a stem having a squared end 74 upon which is mounted an arm 75. A second arm 76 is mounted for pivotal movement upon the rounded portion of the valve stem and is provided with an angular extension 77 and an abutment 78. Secured to the rear transverse frame member 28 in such a manner as to extend over the pipes 66 and 71, and form a housing for the T-joint and the valve contained therein, as well as to serve as a guide for the arms 75 and 76, is a semi-circular housing member 79. Attached to the inner surface of the housing member 79 is a guide plate 80 which serves as an additional guide for the arm 76 and limits the movement of that arm in one direction. An upright bracket 81 is secured to the transverse member 25 and is connected to the angular extension 77 of the arm 76 by a pair of coiled springs 82. The coiled springs 82 tend to retain the angular extension 77 of the arm 76 in the dotted line position, shown in Figure VII. A hand lever 83 is secured to the arm 75 as at 84, forming an extension of the same, the said hand lever being provided with a hand grip 85 for actuating a latch 86 which is adapted to cooperate with the abutment 78 upon the arm 76. A cable 87 is secured to the hand lever 83 at 88 and is adapted to be attached at a plurality of points in the length of the cable to the movable frame at 89.

The mechanism above described serves as a controlling means for the fluid pressure supplied to the cylinders for the purpose of lifting the movable frame. Upon reference to Figure X, it will be seen that the three-way valve 73 serves to connect the outlet pipe 66 and the pipe 70 which communicates with the branches 68, or it may serve to place the pipe 70 in communication with the open ended pipe 71 for the purpose of permitting the fluid within the cylinders to flow freely therefrom, when the movable frame is to be lowered. It will also be seen, upon reference to Figure X, that when the three-way valve 73 is rotated in a counter-clockwise direction from its position shown in that figure, the passage way connecting the pipes 66 and 70 will be restricted, and by turning the three-way valve a sufficient distance in that direction, the pipe 70 will be placed out of communication with the pipe 66 and into communication with the pipe 71. The arm 75 which is secured to a squared portion 74 of the valve stem operates the valve 73 in the manner above described, and it is turned during the upward movement of the frame to which it is connected by the cable 87.

As stated above, the cable 87 may be attached to the movable frame at a plurality of points in its length, whereby the arm 75 will be caused to rotate sufficiently to close the passage between the pipes 66 and 70 at different points in the upward travel of the frame. The arm 76 being pivoted upon a rounded portion of the valve stem and guided in its movement by the plate 80, is capable of limited movement with the arm 75, and in a counter-clockwise direction as seen in Figures VI and VII. The springs 82, however, tend to resist any movement of the arm 76 in a counter-clockwise direction, as seen in Figures VI and VII, and exert a constant force upon the arm 76 through its angular extension 77 to return it to its original position, as shown in Figure VI. When the valve 67 in the outlet pipe 66 has been opened for the purpose of communicating fluid pressure to the cylinders the arm 75 is placed in the position shown in Figure VII, so that the sliding detent 86 upon the arm 75 will engage the abutment 78 upon the arm 76 in such a manner as to move the arm 76 with the arm 75 and in a counter-clockwise direction, as the same is raised. The cable 87 is then attached to the movable frame at a pre-determined point in the length of the cable. In that position of the arms 75 and 76 the three-way valve 73 is in the position shown in Figure X, wherein the pipe 66 is in full communication with the pipe 70. Pressure will thus be communicated to the upright cylinders through the branch pipes 68 in such a manner as to raise the piston head contained therein and the movable frame carried by the piston. When the movable frame has reached a pre-determined height depending upon the point of attachment of the cable 87 thereto, the cable 87 will exert a pull upon the arm 75 to turn it in a counter-clockwise direction. The lever 75 being now connected to the arm 76 through the sliding detent 86 and the abutment 78, any movement of the arm 75 in a counter-clockwise direction will necessarily carry with it the arm 76. The coiled springs 82, however, tend to prevent movement of the arm 76 in that direction, and thus act as a retarding means to prevent excessive movement of the arm 75. As the arm 75 is moved in a counter-clockwise direction by the movement of the movable frame, the three-way valve 73 will be turned in the same direction to diminish the size of the passage way connecting the pipes 66 and 70, and thus diminish the pressure communicated to the cylinders. It is obvious that if the arm 75 was not connected to the arm 76, the passage connecting the pipes 66 and 70 would be entirely closed when the movable platform had reached a given height, and thereafter the platform would be slowly lowered by reason of the steady leakage of air from under the piston head. By connecting the arm 75 with the arm 76, however, the upward pull of the movable frame upon the arm 75 is counter-balanced by the pull of the springs 82. From this construction it results, therefore, that when the movable frame has reached such a point as to nearly close the opening between the pipes 66 and 70, it will cease its upward movement by reason of the decrease in the fluid pressure communicated to the cylinders. If, at this point in the position of the frame, the amount of pressure communicated to the cylinders is insufficient to retain the frame in this position, and the frame consequently commences to settle, the tension of the springs 82 will move the arm 76 and the arm 75 connected thereto in a clockwise direction to slightly increase the opening connecting the pipes 66 and 70, and thus communicate more pressure to the cylinders. The three-way valve 73 and the co-operating mechanism connected therewith thus serve to form a balance governor for communicating a sufficient pressure to the cylinders to raise the movable frame a pre-determined distance and maintain it in that position automatically. The movable frame thus operates the controlling means to diminish the force exerted for raising the same in proportion as the movable frame is raised and by reason of the counter-balancing force exerted by the springs 82 sufficient pressure is communicated to the cylinders for retaining the movable frame at a pre-determined height without any further attention from the operator. When it is desired to lower the movable frame to its original position, the slidable detent 86 may be disengaged from the abutment 78 and the lever arm 75 turned a sufficient distance in a counter-clockwise direction to close communication between the pipes 66 and 70, and to open communication between the pipes 70 and 71. When connection is established between the pipes 70 and 71, the fluid contained in the cylinders beneath the head 22 will be permitted to freely flow back through the pipe 70 and be discharged through the open-ended pipe 71.

In the operation of this device, the truck being readily movable from place to place upon its caster wheels, it may be readily positioned beneath an automobile which has been elevated by a dock hoist, and the dock hoist lowered to place the automobile upon the brackets and stops carried by the movable frame of the truck, the said brackets and stops having been previously adjusted in such a manner as to be located at proper points upon the movable frame for the reception of the axles of the automobile. When the automobile is in proper position upon the truck, it may be transported to any desired point, such as within a freight car, and there raised to a suitable height for receiving the blocking, which is to secure the automobile in the freight car during its transport. The manner of elevating the automobile is as follows: The valve provided in the outlet pipe of the fluid pressure cylinders is opened, and pressure thereby communicated through the various branches of the distributing system to the lower portions of the upright cylinders, where it is admitted to the cylinders at points beneath the piston heads, thereby raising the piston heads and the movable frame carried by the pistons. The equalizing system comprising the pivoted levers and the links connecting the same to each other and to the vertical frames attached to the movable frame, serve to equalize the movement of the frame as it is raised and lowered, regardless of the manner in which the weight of the automobile is distributed upon the movable frame. By means of this equalizing system the movable frame is maintained in a substantially horizontal position while it is being raised, and thus the automobile carried thereby is retained in proper position, as it is raised into place to be secured in the upper part of the car. The height to which it is desired to raise the automobile having been determined, the cable connecting the movable frame with the pivoted lever arm controlling the pressure valve is secured at a suitable point in its length to the movable frame, and the valve in the outlet pipe of the pressure cylinder is opened. As the movable frame is raised by reason of the pressure communicated to the cylinders, the three-way valve is actuated by the pivoted lever arm, as the movable frame reaches the limit of its upward movement as determined by the length of the cable 87, and as a result the upward movement of the movable platform is limited and by reason of the controlling means connected to the pivoted arm the three-way valve is controlled in such a manner as to retain the movable frame in its proper elevated position. Thus the automobile may be raised to a suitable height in the car and automatically maintained in that position while suitable supporting blocking is being placed beneath the same for securing it to the car. When the blocking has finally been secured in place beneath the automobile the lever arm 75 may be disengaged from the arm 76 and the lever arm rotated a sufficient distance to close the passage between the interior of the cylinders and the outlet pipe of the pressure tank, and to place the interior of the cylinders in communication with the open-ended pipe 71. The pressure within the upright cylinders is thus reduced to the normal atmospheric pressure, and the movable frame will fall by its own weight to its initial position, as shown in Figures III and IV.

While we have shown and described in considerable detail a specific embodiment of our invention, it is to be understood that this showing and description is illustrative only, and for the purpose of rendering our invention more clear, and that we do not regard the invention as limited to the details of construction illustrated or described, nor any of them, except in so far as we have included such limitations within the terms of the following claims, in which it is our intention to claim all novelty inherent in our invention broadly as well as specifically.

Having thus described our invention, what we claim as new and desire to secure by Letters Patent, is:

1. In an elevating truck, in combination, a main frame portion, a movable frame portion, means for transmitting movement to the movable frame portion, and means pivoted upon the main frame for equalizing the movement of the movable frame and having portions extending in opposite directions from the points of pivotal connection with the main frame.

2. In a device of the class described, in combination, a vertically movable frame, means for transmitting vertical movement to the frame at a plurality of separate points, and lever means for equalizing the movement of the frame.

3. In a device of the class described, in combination, a movable frame, means for raising and lowering said frame, means comprising a plurality of levers for maintaining the frame substantially horizontal while it is being raised and lowered, and means responsive to the upward movement of said frame and adjustably connected thereto for automatically reducing the force of said first means as said frame approaches a predetermined position.

4. In a device of the class described, in combination, a vertically movable frame, means for imparting movement to the frame at points adjacent the opposite ends thereof, and means comprising a plurality of levers for maintaining the frame in a plane parallel to a given plane during its vertical movement.

5. In a device of the class described, in combination, a main frame, a movable frame, means for raising and lowering the movable frame, and means comprising a plurality of levers pivoted to the main frame adjacent the longitudinal center line thereof for maintaining the movable frame substantially horizontal while it is being raised and lowered.

6. In an elevating truck, a main frame portion, a movable frame portion, fluid operated means for raising the movable frame, means comprising a plurality of levers fulcrumed on one of said frame portions with one end of each operably connected to the other frame portion for maintaining the movable frame substantially horizontal while it is being raised, and means for diminishing the force for raising the frame as said frame approaches a predetermined position.

7. In a device of the class described, in combination, a vertically movable frame, fluid pressure means for raising the frame, a valve for admitting fluid pressure to said means and resiliently retracted means responsive to the movement of the frame for moving said valve to increase or decrease the fluid pressure acting on said raising means dependent upon the position of said frame.

8. In a device of the class described, in combination, a main frame mounted upon supporting wheels so as to be capable of being transported from place to place, a vertically movable frame, fluid operated means for raising the vertically movable frame, and means responsive to the height of said movable frame for automatically decreasing the flow of fluid to said first means and for automatically increasing said flow should said frame descend.

9. In a device of the class described, in combination, a main frame mounted upon supporting wheels for transport from place to place, a vertically movable frame carried by the main frame, fluid operated means for raising the vertically movable frame, a source of fluid pressure supply carried by the main frame whereby fluid pressure may be supplied to the fluid operated means independent of a separate source of supply and means responsive to the position of said movable frame for automatically decreasing the flow of fluid to said first means and for automatically increasing said flow if said frame descends.

10. In a device of the class described, in combination, a main frame, a plurality of supporting wheels for said main frame, a source of fluid supply carried by said main frame, a vertically movable frame, fluid operated means for raising the vertically movable frame and automatically variable means for restricting the flow of fluid as said frame reaches a predetermined height, and for increasing said flow as said frame recedes from said height.

11. In a device of the class described, a movable frame, fluid operated means for lifting the frame, means operated by the movement of the frame for controlling the pressure exerted by the fluid operated means, means adapted to oppose the action of said controlling means, and means for operatively inter-connecting the two last named means whereby they act in opposition to each other.

12. In a device of the class described, in combination, a movable frame, fluid operated means for lifting the frame, means operated by the movement of the frame for controlling the pressure exerted by the fluid operated means, and resiliently actuated means for opposing the action of said controlling means in diminishing the force exerted upon the fluid operated means in lifting the movable frame.

13. In a device of the class described, in combination, a movable frame, fluid operated means for lifting the frame, and a pressure controlling means for controlling the fluid operated means comprising a governor adapted for connection to the frame, and spring actuated means for limiting the movement of the governor in one direction.

14. In a device of the class described, in combination, a movable part, means for communicating fluid pressure to the parts to be moved, and a pressure controlling means comprising a governor adapted for connection with the movable part, and means for resiliently opposing the movement of the governor in one direction.

15. In a device of the class described, the combination of a stationary frame, a vertically movable frame thereon, fluid pressure operated means connecting said frames, a fluid pressure supply, a valve controlling the admission of fluid pressure from said supply to said means, means resiliently restraining movement of said valve from an open to a closed position and means connecting said movable frame with said valve whereby said movable frame will be maintained at a predetermined height.

16. In a device of the class described, the combination of a stationary frame, a vertically movable frame mounted thereon, a fluid pressure operated device for raising said movable frame, a fluid pressure supply, a valve for controlling the admission of fluid pressure from said supply to said device, a lever for freely moving said valve from a closed to an open position, means for resiliently restraining further movement of said valve to a second closed position and a connection between said movable frame and said valve lever adapted to move the valve to closed position when the movable frame has reached a predetermined height, said resiliently restraining means being effective to open said valve upon descent of said movable frame.

In testimony whereof, we affix our signatures.

ARTHUR D. LIGHTNER.
EDWARD HOLMES.